Figure 1:
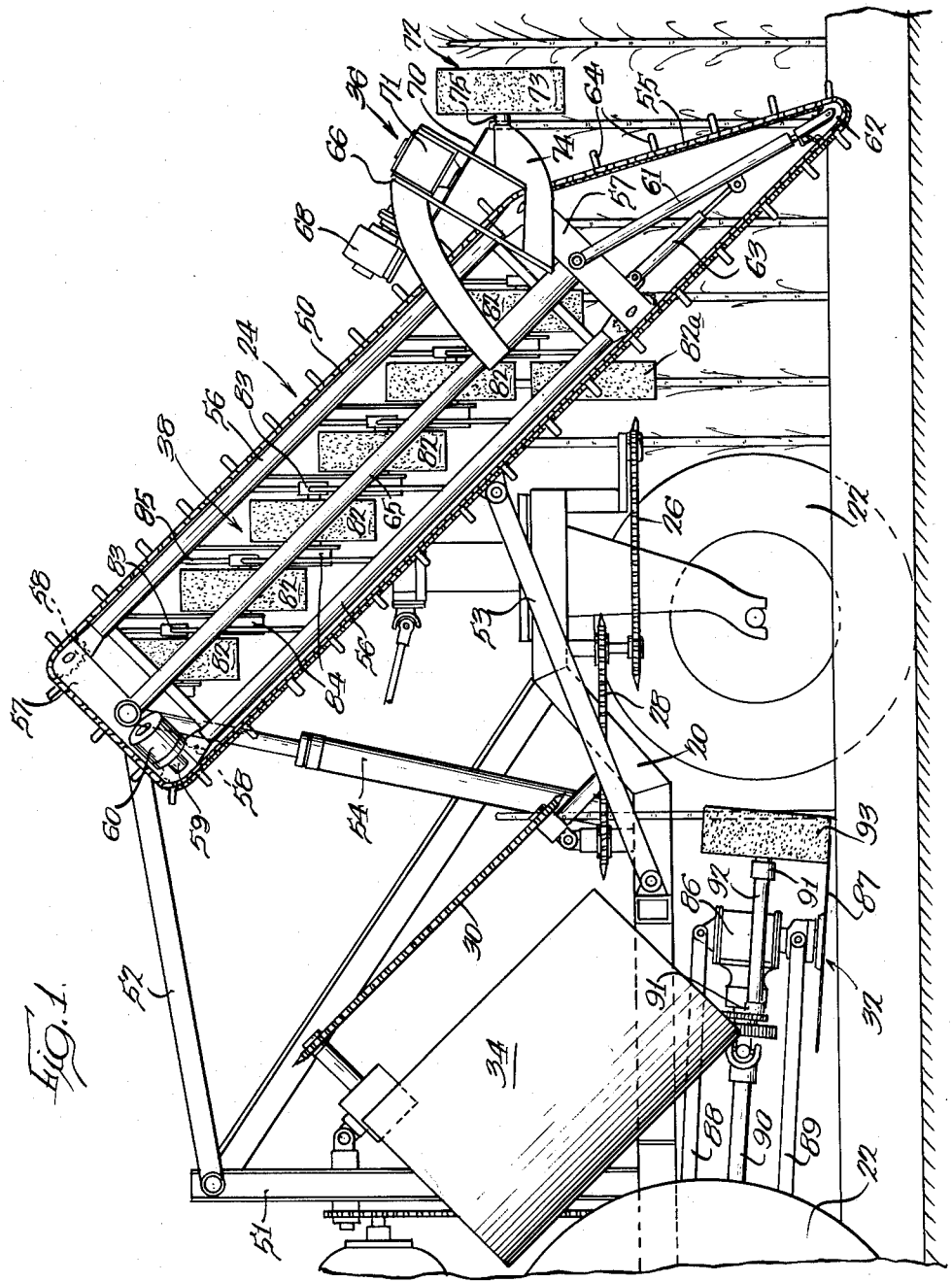

July 2, 1963  S. A. THORNTON  3,095,680
CANE STALK GATHERING, TOPPING, DETRASHING AND SEVERING MEANS
Filed Nov. 5, 1959  5 Sheets-Sheet 1

INVENTOR.
Samuel A. Thornton
BY
Brown, Jackson, Boettcher & Dienner
Attys.

July 2, 1963  S. A. THORNTON  3,095,680
CANE STALK GATHERING, TOPPING, DETRASHING AND SEVERING MEANS
Filed Nov. 5, 1959  5 Sheets-Sheet 2
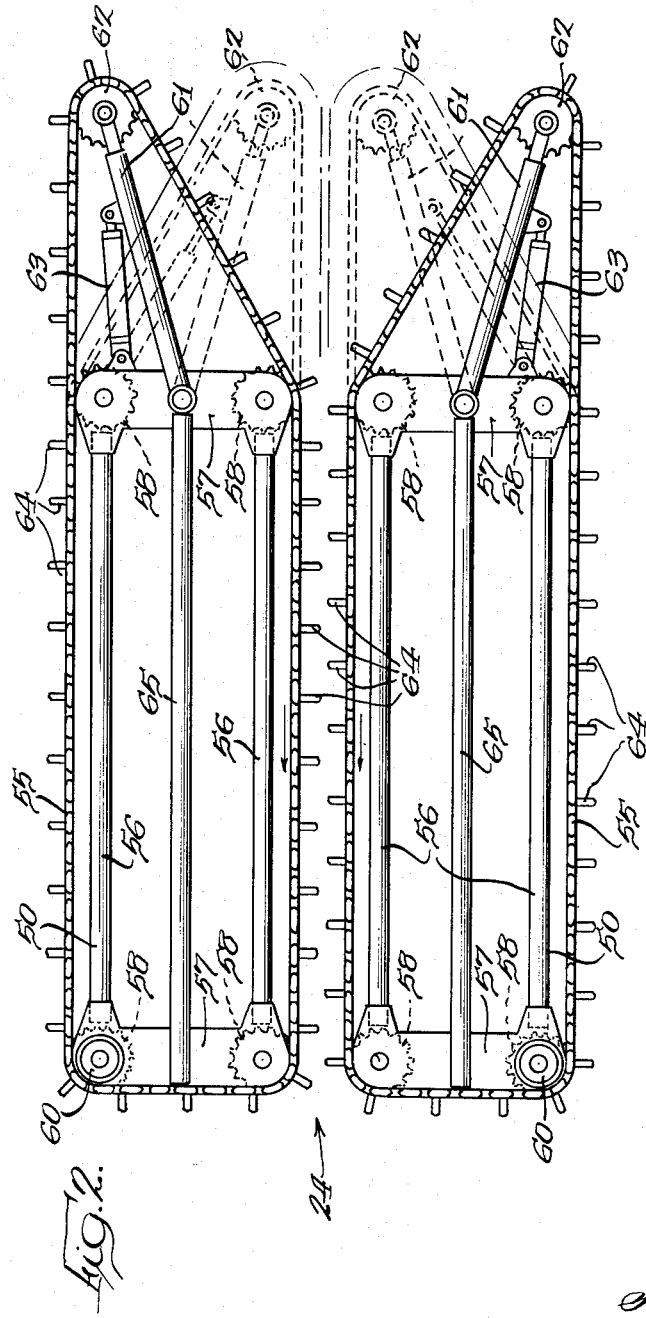
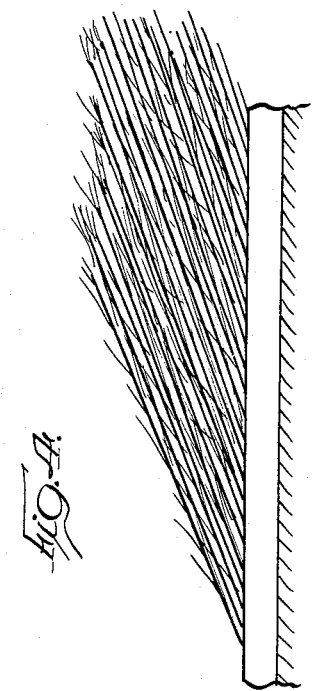
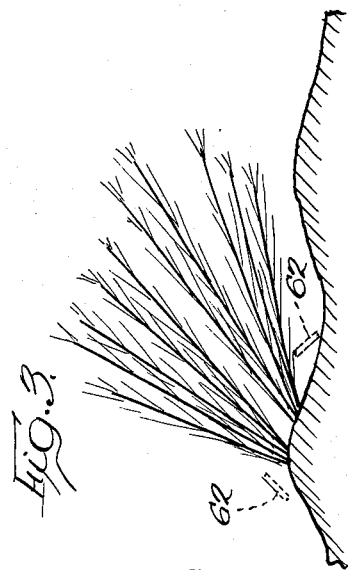
INVENTOR.
Samuel A. Thornton
BY
Brown, Jackson, Boettcher & Dienner
Attys.

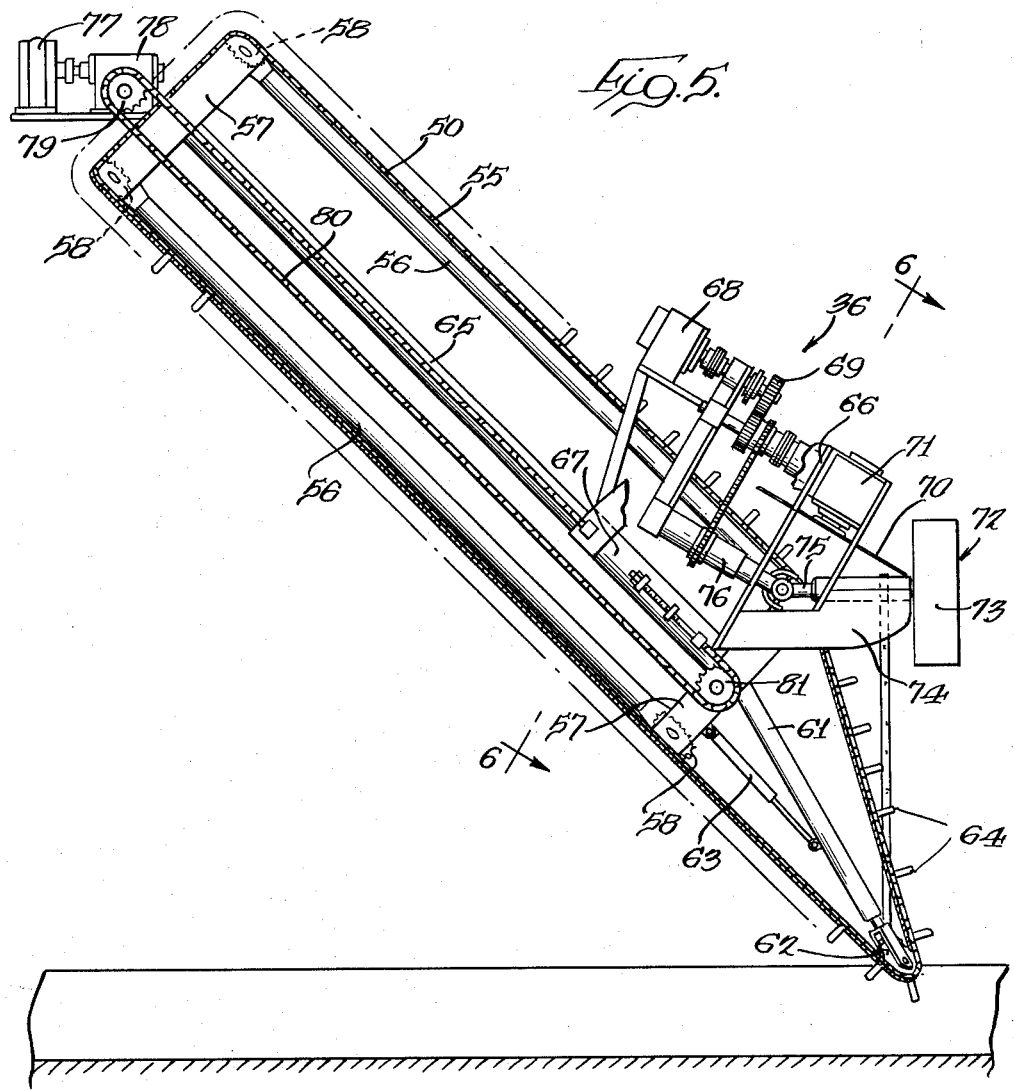
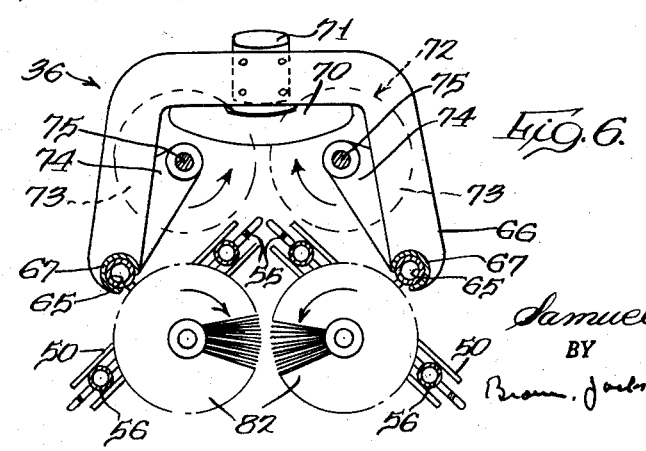

July 2, 1963  S. A. THORNTON  3,095,680
CANE STALK GATHERING, TOPPING, DETRASHING AND SEVERING MEANS
Filed Nov. 5, 1959  5 Sheets-Sheet 4
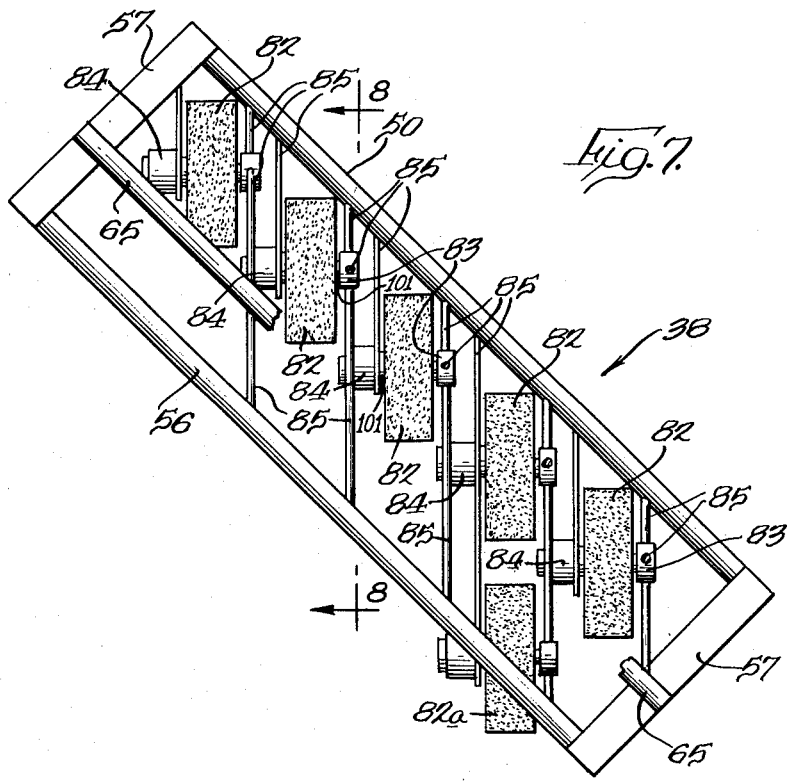
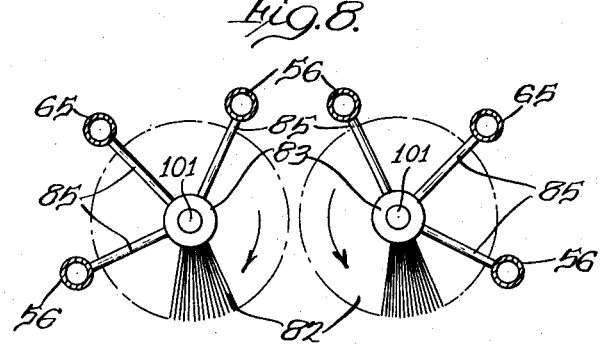
INVENTOR.
Samuel A. Thornton
BY
Brown, Jackson, Boettcher - Dienner
Attys.

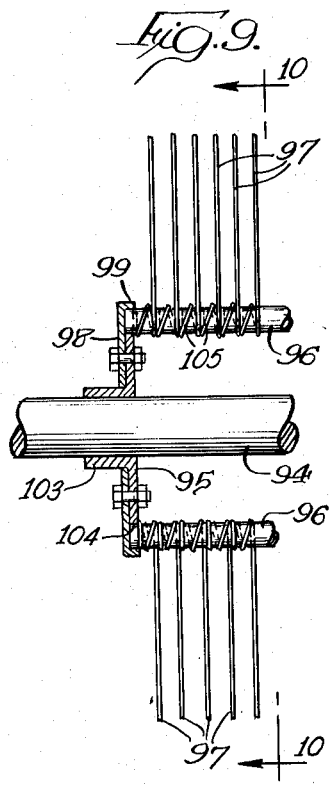
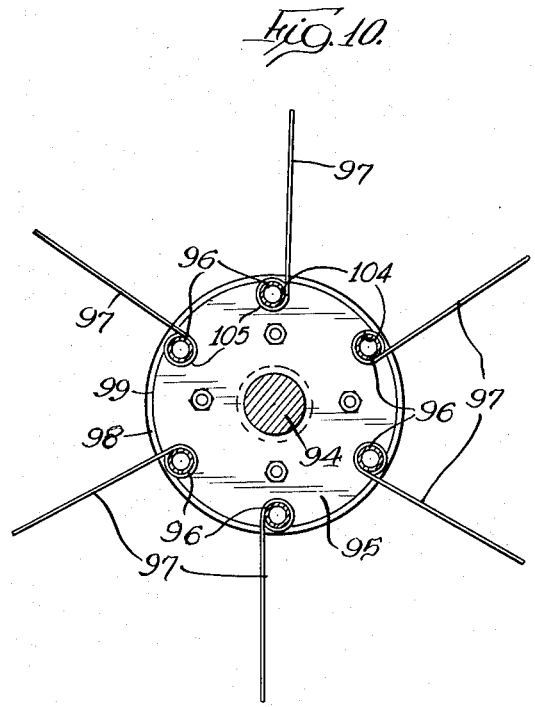
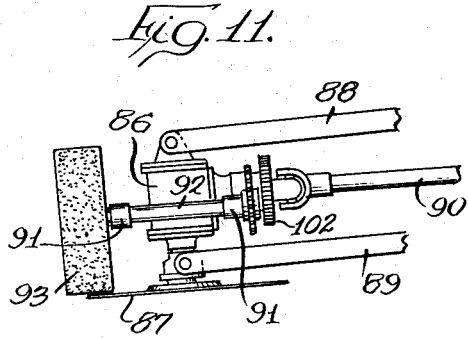
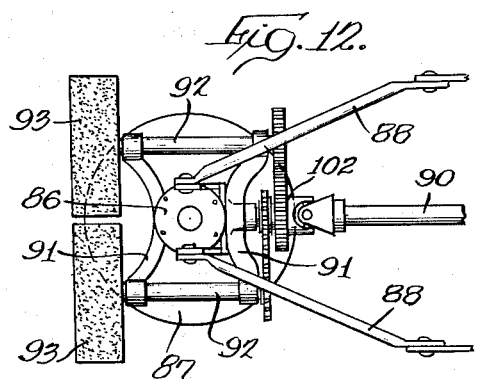

United States Patent Office 3,095,680
Patented July 2, 1963

3,095,680
CANE STALK GATHERING, TOPPING, DE-
TRASHING AND SEVERING MEANS
Samuel A. Thornton, Jeanerette, La.
Filed Nov. 5, 1959, Ser. No. 851,038
11 Claims. (Cl. 56—17)

The present invention relates to the harvesting of sugar cane, and particularly, to improved means for gathering growing cane stalks into an upstanding row, removing from the stalks the undesired foliage at the tops thereof, cleaning the bodies of the stalks, and severing the stalks from their roots at substantially ground level.

Sugar cane is a very tall tropical grass, the stalks or shoots of which are a principal source of sugar. Commercially, sugar cane is cultivated as a row crop. During the growing season, depending upon wind and rain conditions, the cane usually assumes a recumbent jumbled state. In the mechanical harvesting of cane, it has become the practice to first stand the growing cane up in a straight row with the stalks upright, then to remove from the stalks the unwanted leafy matter at the tops thereof, and finally to sever the stalks from their roots at ground level. After severing, the stalks may be transported according to a variety of proposals for accumulation and/or disposition at a particular location to be picked up and transferred to a cart or other vehicle for delivery to the refinery.

The means customarily employed for gathering the stalks into an upstanding row comprises a pair of transversely spaced conveyor chains extending forwardly and downwardly from the front of the harvester vehicle, the chains including opposed runs to be disposed to opposite sides of the row, the two runs being divergent at their front ends and converging toward one another and usually including parallel portions adjacent their upward rearward ends, and means for driving said chains to cause the said runs thereof to move upwardly and rearwardly whereby the chains act to stand the cane stalks upright. The means for removing the tops of the stalks, i.e., topping the stalks, usually comprises a rotary cutting blade which is mounted on the supporting structure for the gather chains. The means for severing the stalks from their roots is similarly a rotary blade, but it is preferably mounted for independent adjustment relative to ground level in the cane rows.

In addition to the foregoing, there have been many proposals in the art for removing from the cane stalks during the harvesting thereof any leafy matter on the body of the stalks, and also any dirt or mud that may have accumulated on the stalks due to the recumbency of the stalks on the ground during the growing season—in brief, to detrash the stalks.

The present invention is directed to apparatus of the character described having generally the same mode of operation for accomplishing the defined results. More particularly, the invention is directed to improved apparatus for gathering, topping, detrashing and severing sugar cane stalks in a most convenient, practical and facile manner.

One object of the invention is to provide improved stalk gathering means including means for transversely adjusting the lead end of each gather chain thereby to accommodate variation in the direction of extension of each chain and the width of the bite defined between the chains at their lead ends, whereby the gather chains may be adjusted commensurate with the degree and direction of recumbency of the cane to facilitate gathering of the cane into a row.

Another object of the invention is to provide gather chain adjusting means in the form preferably of a downwardly and forwardly projecting arm pivotally mounted at its inner end on the supporting frame of each gather chain and a lead sheave mounted on the forward end of the arm for guiding each chain at the lead end thereof, the arm being pivotally adjustable transversely of the chain for the purposes above stated, and also providing means whereby existing gather chain structures may readily be converted to the improved apparatus of this invention.

A third object of the invention is to provide, in combination with the means for transversely adjusting the lead ends of the chains, means for driving the chains at variable speed whereby chain speed may be correlated to the speed of the harvester and the degree and direction of recumbency of the cane to facilitate standing the cane stalks upright.

A further object of the invention is the provision of improved drive means for gather chains comprising a variable speed motor coupled directly to the shaft of the chain driving sheave or sprocket wheel.

Yet another object of the invention is the provision of improved stalk topping means for cane harvesters comprising a topping blade carriage slidably mounted on the forwardly and downwardly inclined frame means of the gather chains for adjustment thereon to vary the elevation of the topping blade pursuant to the height of the cane stalks.

An additional object of the invention is to provide, in combination with the structure described in the preceding paragraph, a detrashing assembly mounted on said carriage immediately adjacent the forward edge of the topping blade, the detrashing assembly including upwardly movable detrashing means for brushing up the foliage adjacent the tops of the stalks and for retaining the tops of the stalks steady to facilitate cutting thereof by the topping blade.

A further object of the invention is the provision of improved cane stalk cutting means applicable both to the topping and severing of stalks and comprising, in combination, a carriage, a stalk cutting blade mounted on the carriage and a detrashing assembly mounted on the carriage adjacent the forward edge of the blade, said detrashing assembly comprising a pair of opposed elements between which the stalks are confined and which serve to hold the stalks steady during cutting thereof, at least one of the elements being movable to effect detrashing of the stalks immediately prior to cutting.

In addition to the foregoing, it is an object of this invention to incorporate in the gathering chain assembly means for detrashing the stalks as they are being gathered and before they are severed from their roots, the said assembly including a forwardly and downwardly inclined and laterally inclined rectangular frame for each gather chain, and detrasher units mounted on each frame in stepped relation longitudinally of the frame, each unit including a portion extending inwardly beyond the vertical plane of the inner edge of the respective frame for detrashing stalks carried between the two frames by the chains, the said frames guiding the chains around the detrasher units and above the said inwardly extending portions of the units.

It is also an object of this invention to incorporate in the above described assembly means for independently operating each of the detrasher units whereby the units may be selectively operated commensurate with the height of the stalks.

It is a further object of this invention to provide improved stalk detrashing units for cane harvesters each comprising a rotor assembly including circumferentially spaced pivot pins, detrashing fingers pivotally mounted on the pins, and means for quickly disassembling said pins to facilitate replacement of said fingers.

A still further object of the invention is the combination of the above described stalk gathering, topping, detrashing and severing means in a compact assembly providing for the harvesting of sugar cane in an expeditious and facile manner.

Other objects and advantages of the invention will become apparent in the following details description.

Now, in order to acquaint those skilled in the art with the manner of making and using my improved stalk gathering, topping, detrashing and severing means, I shall describe, in connection with the accompanying drawings, a preferred embodiment of my said improved means and the preferred manner of making and using the same.

In the drawings:

Sheet 1, containing FIGURE 1, illustrates the complete combination of the gathering, topping, detrashing and severing means of my invention and the manner in which the combination is mounted on a cane harvester or combine; FIGURE 1 being a side elevation of a combine equipped with the combined means of this invention.

Sheet 2, containing FIGURES 2, 3 and 4, depicts the stalk gathering means of my invention; FIGURE 2 being a layout in plan of the gathering means and FIGURES 3 and 4 illustrating two recumbent positions of cane in connection with which the use and operation of my gathering means will be described.

Sheet 3, containing FIGURES 5 and 6, depicts the improved stalk topping means of my invention; FIGURE 5 being a side elevation of the topping means and the supporting frame, and FIGURE 6 being a cross-sectional view of the topping means and the frame taken substantially as indicated by line 6—6 in FIGURE 5.

Sheet 4, containing FIGURES 7 and 8, depicts the detrasher assembly provided according to the invention for cleaning the major portion of the cane stalks; FIGURE 7 being a side elevation of the detrashing means and the supporting frame and FIGURE 8 being a cross-sectional view thereof taken substantially as indicated by line 8—8 in FIGURE 7.

Sheet 5, containing FIGURES 9, 10, 11 and 12, depicts the improved detrashing units and the improved severing means of my invention; FIGURE 9 being a fragmentary longitudinal section of a detrashing unit, FIGURE 10 being a cross-sectional view of the detrashing unit taken substantially as indicated by line 10—10 in FIGURE 9, FIGURE 11 being a side elevation of my improved severing means and FIGURE 12 being a plan view of the severing means.

Referring now to the drawings, and particularly to FIGURE 1, I have shown the improved apparatus of my present invention embodied in a cane combine of the character disclosed and claimed in my co-pending application Serial No. 702,996, filed December 16, 1957, now Patent No. 2,974,464, issued March 14, 1961, to which reference is made for a complete disclosure of the combine and its mode of operation. Suffice it to say here that the combine is a wheeled vehicle including an elongated frame 20. The frame is supported on at least three ground-engaging wheels 22, and mounts a prime mover (not shown) for propelling the vehicle and for providing a source of power for the movable components of the combine.

Mounted on the frame 20 in substantial alignment with the longitudinal center line thereof are a plurality of stalk conveying means including a forwardly extending gathering assembly 24 for gathering growing cane stalks into an upright row, a pair of transport conveyors 26 and 28 for transporting the growing stalks rearwardly relative to the combine, and an inclined elevating conveyor 30 capable of firmly seizing the stalks. Mounted beneath the rearward end portion of the transport conveyor 28 and the forward end portion of the elevating conveyor 30 is a stalk severing assembly 32 which is adapted to sever the stalks from their roots approximately at ground level at substantially the moment when the elevating conveyor seizes the stalks, whereby the later conveyor lifts the stalks upwardly and carries them along its inclined path.

According to my aforesaid patent, the elevating conveyor deposits the severed stalks in a receptacle 34 from which the stalks may be transferred to a cart for delivery to the refinery. The receptacle is an upwardly open box mounted at the same inclination as the conveyor 30 and with one longitudinal edge thereof parallel to the elevating conveyor 30. The stalk severing assembly 32 is mounted immediately below the inner front corner of the receptacle to maintain the transport distance of severed stalks at a minimum, to accommodate minimum conveyor lengths and to facilitate provision of an exceptionally compact harvester or combine.

The illustrated and described combine is, of course, only one form of harvester with which the apparatus of my present invention is adapted for use. Stated broadly, the object of this invention is to gather up the complete crop of cane to provide for delivery to the receptacle 34, or to any other discharge point, only that part of the cane that is valuable for refining into sugar, and to deliver said part of the cane in a clean and fully detrashed condition, irrespective of the character of the harvester employed. To this end, I provide an improved form of gathering assembly 24, improved stalk topping means 36, improved means 38 for detrashing the stalks, a new and improved combined assembly of the means 24, 36 and 38, and an improved severing means 32.

According to this invention, the stalk gathering, topping and detrashing means are all mounted on the same framework, which is comprised of a pair of spaced parallel rectangular frames 50 mounted on the vehicle frame 20 in forwardly and downwardly inclined relation thereto, the two frames extending longitudinally of the vehicle to opposite sides of the longitudinal center line thereof. The two frames are also inclined laterally downward from their adjacent or inner edges to their outer edges for purposes to be described. For adjustably mounting the frames 50 on the harvester vehicle, I provide vertical mast means 51 on the transverse rear portion of the vehicle frame 20 and pivotally mount thereon a supporting boom structure 52 for the upper ends of the frames. The mid-portions of the frames are guidably supported by a strut 53 which is pivotally secured at its opposite ends to the vehicle frame and the frame 50, and the frames are adapted for adjustment by means of an axially extensible and contractable piston-cylinder combination 54, preferably hydraulically or pneumatically actuated, which extends between the vehicle frame and the forward end portion of the boom structure 52. By extending and contracting the piston of the motor 54, the frames are adjusted to vary the elevation of their lower ends relative to ground level. All of the described supporting structure, in the illustrated combine, is disposed to one side of the vehicle center line along the vehicle frame, whereby the receptacle 34 is upwardly unobstructed.

The improved stalk gathering means provided by this invention is mounted on the frames 50 and, as is shown in FIGURE 2, includes a pair of gather chains 55 of conventional construction mounted respectively on the frames. Each frame is substantially rectangular, including a pair of spaced parallel longitudinal beams 56 and a pair of transverse end plates or beams 57 connecting the beams 56 at their ends. Mounted on the end plates 57 at the four corners of the frame are guide sheaves 58 for the respective chain, one of the sheaves, preferably one at the upper end of the frame, comprising a drive wheel or sprocket for the chain and including a drive shaft 59 projecting to the upper side of the frame. According to the present invention, improved drive means are provided for the chains comprising a variable speed motor 60, preferably fluid-pressure operated, mounted on each frame 50 and having its output shaft directly connected, preferably by a flexible coupling, to the drive shaft 59 for the respective chain. By this means, complex drive arrangements are eliminated, both initial and maintenance costs are reduced, and the construction is neat and uncluttered.

Pivotally mounted on the front cross beam 57 of each frame, preferably at the center thereof, is a forwardly extending arm 61 carrying at its forward end a further chain guiding sheave 62. Each arm is pivotally mounted on an axis substantially perpendicular to the plane of the respective frame and is pivotally adjustable about said axis to dispose said sheave 62 at any desired position between the planes of the longitudinal edges of the respective frame 50, as is depicted in solid and dotted lines in FIGURE 2. For pivotally adjusting each arm 61, I provide on each frame an extensible and contractable strut 63, in the form preferably of a fluid pressure operated piston-cylinder unit, which is pivotally mounted at its ends on the front cross beam 57 and the arm 61 of the respective frame. It is to be noted that such pivoted arm structure is particularly suited to conversion of existing gather chain assemblies to the improved apparatus of this invention.

Each chain 55 is reeved over the peripheral surfaces of the five sheaves 58 and 62 on the respective frame, whereby the chains have opposed runs along the adjacent edges of the two frames defining a bite therebetween within which cane stalks are gathered. The forward or leading ends of these runs are normally divergent, as illustrated in solid lines in FIGURE 2, to guide cane stalks into the bite between the two runs and to stand the stalks upright by virtue of the upward rearward inclination of the frames 50. The motors 60 are, of course, operated to move the said runs of the chains upwardly and rearwardly as indicated by the arrows in FIGURE 2.

The improvements provided by the present invention reside in the adjustability of the forward or leading ends of the chains and the particular drive means provided for the chains. In harvesting cane, the stalks are usually recumbent. If the stalks lean all in one direction transversly of the row, as depicted for example in FIGURE 3, the present invention provides for optimum gathering of the stalks with particular facility in that the lead end of the chain to the side of the row toward which the stalks are leaning may be moved outwardly (toward the solid line position of FIGURE 2) to insure gathering of all the stalks, while the lead end of the chain to the other side of the row may be moved inwardly (toward the dotted line position of FIGURE 2) to form a side guide for the stalks when they are moved to upright position and to provide a positive drive for the stalks immediately upon passage of the lead end of the chain. Also, the lateral or transverse inclination of the frames 50 provides for such movement of each sheave 62 that as one is moved inwardly toward the center of the row, it is elevated to clear or mainttain a position above the mound of earth forming the row, while movement of the other sheave outwardly lowers that sheave commensurate with the slope of the earth mound to dispose the same beneath the recumbent cane so that all of the cane will be gathered. These particular facilities of the lead sheaves 62 are depicted by the dotted line representations thereof in FIGURE 3, and are best attained by disposition of the frames at a transverse inclination of about 45 degrees, and also a longitudinal inclination of about 45 degrees.

If, as illustrated in FIGURE 4, the cane is reclining primarily in one direction longitudinally of the row, the lead sheaves 62 may both be swung inwardly toward the positions illustrated in dotted lines in FIGURE 2 so as to engage the stalks throughout the full lengths of the adjacent runs of the two chains, and the chains are driven at appropriate speed by their drive motor 60 to stand the stalks upright. In particular, if the stalks are inclined in the direction of harvester advance, the chains are driven at a speed faster than that of the vehicle so as to pull the stalks into upright position. If the stalks are inclined opposite the direction of harvester advance, then the chains are driven slower than the vehicle so that the chains will push the stalks into upright position as they are gathered. For these purposes, the chains include laterally projecting fingers 64 engageable with the stalks to effect appropriate movement thereof.

In the event the cane is inclined askew of the rows, both the sheaves 62 and the speed of the chains may be adjusted in appropriate manner obvious from the foregoing to cause the stalks to be stood upright in a straight row. Thus, any direction and degree of recumbency of the cane stalks can be compensated for by suitable adjustment of the lead sheaves 62 of the chains 55 and by adjustment of the speed of the chain driving motors 60 to stand the stalks upright in a straight row as the harvester vehicle or combine is advanced along the row.

As the stalks are gathered into an upstanding row by the above described means, it is intended that the undesired foliage at the tops of the stalks be removed, i.e., that the stalks be topped. The stalks of sugar cane may attain a height of anywhere from about 4 feet to about 8 feet, depending upon growing conditions. According to the present invention, I provide an improved topping assembly 36 (illustrated in detail on Sheet 3, FIGURES 5 and 6) that is adjustable longitudinally of the gather chain frames 50 to dispose the topping blade at an elevation commensurate with the height of the stalks without necessitating movement of the gathering means from its optimum disposition at an angle of about 45 degrees to horizontal. In particular, I provide frames 50 of a length to dispose their upper ends at an elevation of about ten feet above, and their lower ends at an elevation no greater than about four feet above, the lead sheaves 62 of the gather chains when the frames are disposed at a longitudinal inclination of about 45 degrees. On each frame, I provide a longitudinal guide rail 65 for slidably supporting the topping assembly 36, each rail preferably being disposed centrally between the longitudinal beams 56 of the respective frame in upwardly and outwardly spaced relation to the plane of the frame members 56 and 57. Suitably, each rail extends longitudinally between the end plates 57 of the respective frame and is affixed thereto. If desired, the rails could be extended beyond the end plates 57 to accommodate further adjustment of the topping assembly.

The topping assembly 36 comprises a carriage 66 of inverted U-shape adapted to straddle the space between the two frames in upwardly spaced relation to their adjacent edges. The carriage includes a plurality of frame members connected to one another at the bight portion of the U and diverging downwardly therefrom at each leg of the U and connected at their lower ends to particylindrical elongate bearings 67 which are slidably mounted respectively on the rails 65, whereby the carriage is slidable upwardly and downwardly along the inclined path defined by the gather chain frames. The legs of the carriage 66 extend upwardly to a level above the adjacent runs of the two chains 55 and the bight portion of the U bridges over or straddles these runs. The carriage mounts thereon a motor 68, preferably fluid-pressure operated, which is connected by a suitable transmission 69 to a rotary cutting blade 70. The blade 70 preferably comprises a circular disc having a shaft supported in a bearing assembly 71 mounted on the bight portion of the carriage in such position that the blade is disposed centrally below the bight portion of the carriage generally parallel to and just above the plane of the adjacent runs of the gather chains, with its axis of rotation centrally between the vertical planes of said runs of the chains. Consequently, the blade 70 is disposed with its peripheral cutting edge in intersecting relation to the path of stalk transport to cut the stalks, and the blade is adjustable longitudinally of the frames to various elevations anywhere from about 4 feet to about 8 feet above the ground level of the cane row, whereby the blade may be precisely adjusted to remove only the undesired leafy matter at the very tops of the stalks irrespective of stalk height.

In addition to the topping blade, the carriage 66 mounts thereon a detrashing means 72 comprised of a pair of rotary detrasher units 73. In particular, the carriage 66 includes forwardly extending horizontal frame portions 74 which are disposed upwardly and inwardly of its bearings 67 and which themselves form horizontal bearings disposed above and to opposite respective sides of the adjacent runs of the gather chains and below the topping blade 70. Journalled in each bearing is a shaft 75 which projects forwardly and rearwardly thereof, each shaft at its forward end supporting one detrasher unit 73 and at its rearward end being coupled to drive means 76 extending between the shaft and the said transmission 69. The drive means and transmission include suitable conventional means for driving the shafts 75 in opposite directions, and preferably in such directions that the detrashers are moved inwardly and upwardly toward one another, as indicated by the arrows in the phantom representation of the detrashers in FIGURE 6. The shafts 75 are preferably located in a common horizontal plane just below the lower forward edge portion of the blade 70 and the two detrashers are mounted on the shafts just forwardly of the blade.

In use, the detrasher units 73 define a bite therebetween aligned longitudinally with the bite defined between the gather chains, whereby the upper ends of the stalks gathered by the chains are moved between the detrashers 73. The two detrashers exert upwardly directed forces on the stalks, thereby to assist the chains in standing the stalks upright and to brush or comb the long leaves at the tops of the stalks upwardly to expose solely the stalks to the cutting edge of the blade. Also, the detrashers remove from the stalks any dirt, dust or mud that may be on the upper end portion of the stalks, thereby to expose a clean and detrashed portion of each stalk to the blade. Since the blade is disposed with its cutting edge just above the axes of the detrashers, it is required to cut through just the stalks and not all of their foliage, thereby to preserve the blade and prolong the life of the cutting edge. In addition, since the blade is located immediately rearwardly of the detrashing means, the two detrashers serve to hold the stalks erect and steady thereby to facilitate the work of the blade in cutting off the tops. These functional advantages are a particular improvement afforded by the combination according to the present invention of a topping blade and cooperable detrasher means on a common carriage, the elevation of which may be adjusted commensurate with the height of the stalks being topped.

To effect adjustment of the elevation of the topping assembly 36, I prefer to provide mechanical drive means for the carriage 66, which means, like the other driving elements of my improved apparatus, is preferably fluid-pressure operated. Specifically, I mount on the upper end portion of one of the frames 50 a reversible motor 77 including a gear box 78 through which a sprocket 79 is driven. A chain 80, which is fixedly secured at one end and adjustably secured at its other end to the adjacent carriage bearing 67, is reeved over the sprocket 79 and an idler sprocket 81 mounted on the lower cross beam of the respective frame, whereby the motor 77 is adapted to slide the carriage upwardly and downwardly on the guide rails 65.

Referring now to Sheet 4 of the drawings, which contains FIGURES 7 and 8, I have shown the particular manner in which I mount the detrashing means 38 of this invention on the same framework that supports the gather chains 55 and the topping assembly 36. As above described, each frame 50 includes longitudinal beams 56 and transverse beams 57 which define a common plane inclined from its inner to its outer longitudinal edges at an angle of about 45 degrees. Mounted in upwardly spaced relation to the beams 56 and 57 is the guide rail 65, whereby each frame includes three longitudinal members disposed in triangular relation. The frame is thus open in the downwardly and inwardly facing direction, and it is within this open space that I mount the detrashing means 38. The detrashing means on each frame is comprised of a plurality of rotary detrasher units 82 mounted on longitudinally extending horizontal axes in stepped relation to one another longitudinally of the respective frame. Each detrasher unit has a circular path of movement of approximately the largest diameter accommodated by the frame (See FIGURE 8) and is mounted so that its circular path of movement projects beyond the vertical plane of the inner longitudinal edge of the frame and into the vertical plane of the adjacent run of the gather chain 55, whereby the peripheral surface of the detrasher is disposed to contact the cane stalks gathered by the chains 55. Such disposition of the units 82 is facilitated by the transverse inclination of the frame. Each detrasher includes a shaft 101 journalled at one end in a bearing 83 and coupled at its other end to a drive motor 84, which bearing and motor are supported on their respective frame 50 by means of struts 85 extending between the bearing or motor and the longitudinal beam members 56 and 65 of the frame. The detrasher units are preferably all of the same diameter and are successively stepped upwardly along the frame in vertical increments approximately to one-half the diameter of the units.

The detrasher units 82 on the two frames are preferably mounted identically so that the units are paired transversely of the frames whereby each pair defines a bite therebetween aligned with the bite between the adjacent runs of the two gather chains. Consequently, the stalks gathered by the chains are moved between the pairs of detrashers to be detrashed thereby. The detrashers 82 of each pair are rotated in opposite directions, and are preferably rotated inwardly and downwardly toward one another to exert a downward brushing effect on the stalks, thereby to remove from the stalks the cane leaves, unwanted vegetation, dirt, dust and mud. Since the detrashers are stepped upwardly along the frames 50 in pairs, substantially the entirety of the portions of the stalks between the lower and the upper extremities of the frames is detrashed. To accommodate detrashing of the lower end portions of the stalks, the severing assembly 32 includes a detrashing means, as will be described, and each frame 50 may also carry a depending detrasher unit 82a identical to and mounted below the second one of the series of detrashers 82. The motors 84 for the detrashers may all the independent of one another or the two motors of each pair of detrashers may be interconnected in a known manner, and in either case the pairs of detrasher units may be driven selectively by conventional means commensurate with the height of the stalks being harvested. For example, for eight foot high stalks, all the detrashers would be operated; for six foot stalks the two top pairs of detrashers would be rendered inoperative; and for four foot stalks, it would be necessary to operate only the lowest pair of units 82, the units 82a and the detrashing means provided on the topping assembly 36 and the severing means 32, thereby to conserve the apparatus involved.

Due to the provision of the rectangular frames 50 inclined both longitudinally and transversely of the harvester, I have provided means whereby the gathering, topping and detrashing means may be conveniently combined in an exceptionally compact assembly and wherein every component performs its intended function in a most practical and efficient manner. The frames provide means whereby the gather chains are conducted around the detrashers without interference therewith, whereby the adjacent runs of the chains are disposed above the detrashers so as not to be in the path of the refuse removed from the stalks, whereby the chains hold the stalks erect during detrashing, whereby the lead ends of the chains are disposed in non-interfering relation to the detrashers and are adjustable both transversely and vertically along an inclined path correlated to the mounding of the earth in the cane rows, and whereby the cane topping assembly can be mounted on the same framework for adjustment along the longitudinally inclined frames to vary the elevation of the topping blade without variation in the inclination of the frames or the disposition of the detrashers.

In addition to this compact assembly, the present invention provides, in combination therewith, an improved severing means 32 which is especially distinguished by the cooperative association of a detrashing means and a severing blade, similar to that achieved in the topping assembly 36, and by the disposition of a detrashing means in such relation to the detrashing means 72, 82 and 82a of the said assembly as to provide for complete detrashing of each stalk. In particular, as shown in FIGURES 11 and 12, the severing means 32 comprises a carriage 86 on which a circular cutting blade 87 is mounted for rotation in a generally horizontal plane. The carriage 86 is pivotally mounted on a vertically adjustable supporting boom 88 and an adjustable strut 89 extends between the carriage and the boom, whereby the carriage may be adjusted vertically and may be tilted about its pivotal support on the boom to dispose the blade 87 at an optimum cutting position relative to the top of the mound of earth in which the row of cane is growing. The blade is adapted to be rotated by means of a shaft 90 suitably driven from a power take-off on the prime mover of the harvester vehicle.

At its forward and rearward sides, the carriage 86 includes transverse beams 91 which at their ends form longitudinally aligned bearings for a pair of shafts 92 which are connected at their rearward ends by suitable transmission means 102 to the power shaft 90 to be rotated in opposite directions thereby. At its forward end, each shaft 92 carries a detrasher unit 93, the units being disposed with their peripheries immediately above the blade 87 and projecting slightly forwardly of the cutting edge of the blade, whereby the units, in addition to detrashing the lower extremities of the stalks prior to severing thereof, will hold the stalks during severing to enhance the performance of the blade. Preferably the shafts 92 are rotated in such directions as to cause the detrashers 93 to rotate inwardly and downwardly toward one another so as to remove vines, weeds and loose trash from the bottoms of the stalks prior to elevation of the severed stalks by the conveyor 30.

As shown in FIGURE 1, the severing means 32 is mounted centrally below the upper rearward ends of the frames 50 so that the stalks are severed from their roots only upon completion of the gathering, topping and detrashing functions, and immediately prior to deposit of the clean stalks in the receptacle 34.

By virtue of the described assembly of components, I have provided for complete harvesting of all of the stalks, my improved gathering means assuring accumulation of all stalks in an upright position in a straight row, my topping assembly providing for efficient topping of the stalks at a precisely selected height, and my improved detrashing assembly insuring that the stalks are cleaned throughout their lengths. To facilitate control of the described apparatus, the motor means 54, 60, 63, 68, 77 and 84 are all fluid pressure operated and supplied from a source on the vehicle including suitable pumps or compressor means (not shown) operated by the prime mover of the harvester, the motors being supplied with fluid under pressure, under suitable control by an operator.

Relative to the detrashers, I prefer that they all be of the same size and of the construction illustrated in FIGURES 9 and 10. In particular, each detrasher unit includes an axial shaft 94 to which are fixedly secured a pair of axially spaced discs 95 (only one of which is shown). Each disc includes a hub 103 fixed to the shaft and has a plurality of circumferentially spaced arcurate openings 104 in its radially outer edge, preferably six in number, and disposed at equal spacings. Received within each such opening is an axially extending pivot pin or tube 96 which is of a length equal to the distance between the exterior faces of the two discs, whereby each pin is received at its ends in an axially aligned pair of the openings in the two discs. Pivotally mounted on each pin are a plurality of outward extending fingers 97, each comprising a rod, wire or filament having a pre-formed loop 105 at its inner end of a diameter larger than the respective pin and slipped over the pin. Consequently, each finger is pivotally and removably mounted on the respective pin. Each loop preferably is spread in an axial direction to provide spacing between adjacent fingers.

To lock the finger mounting pins 96 in position on the discs 95, an annular end cap 98 is secured to the exterior surface of each disc, each cap having an inner diameter larger than the disc hub and an outer diameter larger than the circle defined by the radially outward surfaces of the pins 96, and an axially extending flange 99 overlying the said pins and retaining them in said openings. By virtue of the described structure, one end cap can conveniently be removed, whereupon the pins or any one thereof may be removed from the discs and any finger or fingers thereon removed or replaced to facilitate maintenance of the detrasher units.

In use, rotation of the shaft, discs and pins, which I term a rotor, results in the fingers standing radially outward from the rotor for engagement with cane stalks. Upon striking a stalk, however, each finger is free to pivot about its mounting pin independently of the other flanges thereby to avoid damaging the stalks and bending and abusive treatment of the fingers, while at the same time assuring complete detrashing of the stalks.

From the foregoing, it is to be appreciated that the present invention provides improved means of economical and practical construction for gathering, topping, detrashing and severing cane stalks in a most facile manner, the said means including an improved stalk gathering assembly, an improved stalk topping assembly, an improved stalk detrashing assembly, improved detrashing units, an improved stalk severing assembly, and an improved combination of the said assemblies. Thus, it is believed apparent that the objects of the invention have been shown herein to be attained in a convenient, economical and practical manner.

While I have shown and described what I regard to be the preferred embodiment of my invention, it is to be appreciated that various changes, rearrangements and modifications may be made therein without departing from the scope of the invention, as defined by the appended claims.

I claim.

1. Stalk gathering and detrashing means for cane combines comprising a gather chain having a leading end and a trailing end, a rectangular supporting frame for said chain having guide sheaves at the corners thereof for guiding the chain for movement about said frame, said frame being inclined rearwardly upward longitudinally thereof from the leading end to the trailing end of said chain and being inclined laterally downward from one longitudinal edge to the other longitudinal edge thereof, a plurality of rotary detrashers mounted on said frame in the space between the longitudinal edges thereof, said detrashers being mounted for rotation about vertically spaced horizonal axes generally paralleling the longitudinal edges of said frame, each detrasher including a peripheral portion extending beyond the vertical plane of said one longitudinal edge of said frame and into the vertical plane of the run of the chain adjacent said one longitudinal edge, said sheaves on said frame guiding said chain around said detrashers and spacing the said run thereof vertically above the said portion of each detrasher, an arm pivotally mounted on said frame adjacent the lower forward edge thereof and extending forwardly downward therefrom, and a guide sheave for said chain mounted on said arm adjacent the forward end thereof, said sheave guiding said chain forwardly downward and rearwardly upward relative to the lower end of said frame, said arm being pivotally adjustable on said frame to vary the direction of forward extension of the lead end of said chain.

2. Stalk gathering, topping and detrashing means for cane combines comprising a pair of transversely spaced gather chains having leading ends and trailing ends, a rectangular supporting frame for each of said chains having guide sheaves at the corners thereof for guiding the respective chain for movement about the respective frame, said frames being inclined rearwardly upward longitudinally thereof from the leading ends to the trailing ends of said chains and being inclined laterally downward from their adjacent longitudinal edges to their other longitudinal edges, a plurality of detrashers mounted on each of said frames in the space between the longitudinal edges thereof, each detrasher including a portion extending beyond the vertical plane of the inner longitudinal edge of the respective frame and into the vertical plane of the run of said chain adjacent said inner longitudinal edge, the said sheaves on each frame guiding the respective chain around said detrashers and spacing the said run thereof vertically above the said portions of said detrashers, an arm pivotally mounted on each frame adjacent the lower forward edge thereof and extending forwardly downwardly therefrom, a guide sheave for the chain on the respective frame mounted on the respective one of said arms adjacent the forward end thereof, said sheave guiding the respective chain forwardly downward and rearwardly upward relative to the lower end of the respective frame, said arms being pivotally adjustable on said frames to vary the direction of forward extension of the lead end of each chain and the width of the bite defined between the lead ends of the two chains, each of said frames including at the upper outer side thereof a longitudinally extending guide rail spaced from said detrashers and said chains, a carriage straddling the inner longitudinal edges of said frame and slidably mounted adjacent its ends on said guide rails, and a stalk topping blade mounted on said carriage centrally above the space between the said frames, said carriage being slidably adjustable on said rails for varying the elevation of said blade.

3. Stalk gathering, topping and detrashing means for cane combines comprising a pair of transversely spaced gather chains having leading ends and trailing ends, a rectangular supporting frame for each of said chains having guide sheaves at the corners thereof for guiding the respective chain for movement about the respective frame, said frames being inclined rearwardly upward longitudinally thereof from the leading ends to the trailing ends of said chains and being inclined laterally downward from their adjacent longitudinal edges to their other longitudinal edges, a plurality of detrashers mounted on each of said frames in the space between the longitudinal edges thereof, each detrasher including a portion extending beyond the vertical plane of the inner longitudinal edge of the respective frame and into the vertical plane of the run of the respective chain adjacent said inner longitudinal edge, the said sheaves on each frame guiding the respective chain around said detrashers and spacing the said runs thereof vertically above the said portions of said detrashers, an arm pivotally mounted on each frame adjacent the lower forward edge thereof and extending forwardly downward therefrom, a guide sheave for the chian on the respective frame mounted on the respective one of said arms adjacent the forward end thereof, said sheave guiding the respective chain forwardly downward and rearwardly upward relative to the lower end of the respective frame, said arms being pivotally adjustable on said frames to vary the direction of forward extension of the lead end of each chain and the width of the bite defined between the lead ends of the two chains, each of said frames including at the upper outer side thereof a longitudinally extending guide rail spaced from said detrashers and said chains, a carriage straddling the inner longitudinal edges of said frames and slidably mounted adjacent its ends on said guide rails, a stalk topping blade mounted on said carriage centrally above the space between said frames, said carriage being slidably adjustable on said frames for varying the elevation of said blade, and stalk detrashing means mounted on said carriage immediately forward of said blade, said detrashing means including at least one detrasher to one side of the longitudinal center line of the carriage and a horizontally opposed cooperable member to the other side of said center line for holding stalks steady during topping thereof by said blade.

4. Stalk gathering, topping, detrashing and severing means for cane combines comprising a pair of transversely spaced gather chains having leading ends and trailing ends, a rectangular supporting frame for each of said chains having guide sheaves at the corners thereof for guiding the respective chain for movement about the respective frame, said frames being inclined rearwardly upward longitudinally thereof from the leading ends to the trailing ends of said chains and being inclined laterally downward from their adjacent longitudinal edges to their other longitudinal edges, a plurality of detrashers mounted on said frames in the space between the longitudinal edges thereof, each detrasher including a portion extending beyond the vertical plane of the inner longitudinal edge of the respective frame and into the vertical plane of the run of the respective chain adjacent said inner longitudinal edge, the detrashers on said frames being paired transversely of said frames and the said portions of each pair being opposed to one another, the said sheaves on each frame guiding the respective chain around said detrashers and spacing the said run thereof vertically above the said portions of said detrashers, an arm pivotally mounted on each frame adjacent the lower forward edge thereof and extending forwardly downward therefrom, a guide sheave for the chain on the respective frame mounted on each of said arms adjacent the forward end thereof, said sheave guiding the respective chain forwardly downward and rearwardly upward relative to the lower end of the respective frame, said arms being pivotally adjustable on said frames to vary the direction of forward extension of the lead end of each chain and the width of the bite defined between the lead ends of the two chains, each of said frames including at the upper outer side thereof a longitudinally extending guide rail spaced from said detrashers and said chains, a carriage straddling the inner longitudinal edges of said frames and slidably mounted adjacent its ends on said guide rails, a stalk topping blade mounted on said carriage centrally above the space between said frames, said carriage being slidably adjustable on said frames for varying the elevation of said blade, stalk detrashing means mounted on said carriage immediately forward of said blade, a bottom severing blade disposed beneath the upper rearward end portions of said frames centrally below the space between said frames, a vertically adjustable carriage for said severing blade, and stalk detrashing means mounted on the last-named carriage adjacent the forward edge and immediately above said severing blade, each of the said detrashing means adjacent said blades including at least one detrasher to one side of the longitudinal center line of the respective carriage and a horizontally opposed cooperable member to the other side of said center line for holding stalks steady during cutting thereof by the respective blade.

5. Stalk gathering, topping, detrashing and severing means for cane combines comprising, in combination, a pair of chains including transversely spaced opposed runs for gathering salks into the bite therebetween, said runs being normally divergent in the forward direction for defining a progressively diminishing bite therebetween in the direction from the forward ends thereof toward the rear thereof, frame means for supporting said chains, guide sheaves supported on said frame means for guiding the chains for movement thereon, said guide sheaves including a lead sheave adjacent the forward end of each chain and means adjustably mounting each lead sheave on said frame means for adjustment transversely of said chains for varying the directions of extension of the forward ends of said runs and for adjusting the width of the bite therebetween, said frame means being inclined rearwardly upward from the forward ends to the rearward ends of said chains for disposing the forward ends of said chains adjacent ground level and the rearward ends of said chain at an elevation significantly above ground level for picking up recumbent stalks and standing them in a row, variable speed drive means for said chains for assisting in standing the stalks in a row, a plurality of pairs of detrashers mounted on said frame means, the detrashers of each pair being mounted to opposite sides of and below the bite defined between said runs of said chains and defining therebetween a bite aligned vertically with said bite between said runs, a carriage slidably mounted on said frame means above said runs of said chains and said detrashers for movement in a direction generally parallel to the said bite defined between said runs of said chains, a stalk topping blade mounted on said carriage above said chains and extending over the said bite defined therebetween, said carriage being slidably adjustable on said frame means for varying the elevation of said topping blade above ground level, stalk detrashing means mounted on said carriage immediately forward of said blade, a bottom severing blade disposed beneath the upper rearward end portions of said runs of said chains centrally below the bite defined therebetween, a vertically adjustable carriage for said severing blade, and stalk detrashing means mounted on the last-named carriage adjacent the forward edge and immediately above said severing blade, each of said detrashing means adjacent said blades including at least one detrasher to one side of the bite defined between said runs of said chains and a horizontally opposed cooperable member to the other side of said bite for holding stalks steady during cutting thereof by the respective blade.

6. A stalk gatherer for cane comprising laterally spaced and opposed gathering and conveying means, at least one of said means comprising an endless chain having a forward and a rearward section, said rearward section having a flight extending substantially parallel to the other of said means, and said forward section having the flights of said chain forwardly converging, means supporting the forward end of said forward section, and means associated with said supporting means for laterally adjusting said supporting means.

7. A stalk gatherer for cane as defined in claim 6, in which said gathering and conveying means comprise a pair of chains each having a rearward section substantially parallel to the other and a forward section swingable laterally relative to the rearward section, a pair of sheaves each supporting the forward end of one of the forward sections, and means associated with said sheaves for selectively adjusting the sheaves laterally.

8. A stalk gather for cane substantially as defined in claim 6, wherein said means for laterally adjusting said supporting means comprise a forwardly projecting arm carrying the supporting means adjacent its forward end and mounted adjacent its opposite end for movement laterally of the chain.

9. A stalk gatherer substantially as defined in claim 8, in which said arm is pivoted at its said opposite end, and said adjusting means further comprise extensible strut means connected to the arm for pivotally varying the position of the arm laterally relative to the chain.

10. A stalk gatherer for cane comprising a pair of laterally spaced opposed stalk gathering elements having leading and trailing ends, frame means inclined rearwardly upwardly and supporting said gathering elements at a corresponding inclination with said leading ends adjacent ground level and said trailing ends elevated above ground level for raising recumbent stalks to upstanding position held between the gathering elements, a carriage slidable longitudinally on said inclined frame means, stalk topping cutter means mounted on said carriage extending above the gathering elements and over the space between the gathering elements to cut said upstanding stalks, and means for adjusting the position of the carriage longitudinally on the frame means to vary the elevation of the cutter means above ground level in accordance with the stalk height while maintaining the elevation thereof above the gathering elements substantially constant.

11. A stalk gatherer for cane comprising a pair of laterally spaced opposed stalk gathering elements having leading and trailing ends, frame means inclined rearwardly upwardly and supporting said gathering elements at a corresponding inclination for holding stalks therebetween in upright cutting position, means slidable longitudinally on said inclined frame means, stalk topping cutter means mounted on said slidable means and extending across the space between the gathering elements to cut said upright stalks, and means for adjusting the position of the slidable means longitudinally on the frame means to vary the elevation of the cutter means above ground level in accordance with the height of the stalks to be cut while maintaining substantially constant the spacing of the cutter means from the gathering elements.

References Cited in the file of this patent

UNITED STATES PATENTS

| | | |
|---|---|---|
| 1,118,636 | Cockrell | Nov. 24, 1914 |
| 1,265,244 | Piatt | May 7, 1918 |
| 2,179,584 | Bourg | Nov. 14, 1939 |
| 2,435,334 | Wurtele | Feb. 3, 1948 |
| 2,458,299 | Powers | Jan. 4, 1949 |
| 2,482,530 | Wurtele | Sept. 20, 1949 |
| 2,556,509 | Thomson | June 12, 1951 |
| 2,634,570 | Brockman et al. | Apr. 14, 1953 |